United States Patent
Lin (10) Patent No.: US 9,632,690 B2
(45) Date of Patent: Apr. 25, 2017

(54) METHOD FOR OPERATING USER INTERFACE AND ELECTRONIC DEVICE THEREOF

(71) Applicant: Acer Incorporated, New Taipei (TW)

(72) Inventor: Hsuan-Wei Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 388 days.

(21) Appl. No.: 14/191,469

(22) Filed: Feb. 27, 2014

(65) Prior Publication Data

US 2015/0149954 A1     May 28, 2015

(30) Foreign Application Priority Data

Nov. 28, 2013  (TW) ............................. 102143485 A (51) Int. Cl.
| | | |
|---|---|---|
| *G06F 3/0488* | (2013.01) | |
| *G06F 3/0481* | (2013.01) | |
| *G06F 3/0486* | (2013.01) | |
| *G06F 3/0484* | (2013.01) | |

(52) U.S. Cl.
CPC .......... *G06F 3/0488* (2013.01); *G06F 3/0486* (2013.01); *G06F 3/04817* (2013.01); *G06F 3/04842* (2013.01)

(58) Field of Classification Search
CPC ... G06F 3/0488; G06F 3/0486; G06F 3/04817
See application file for complete search history.

(56) References Cited

U.S. PATENT DOCUMENTS

| | | | | |
|---|---|---|---|---|
| 8,760,426 | B1* | 6/2014 | Strand ..................... | G09G 5/00 345/169 |
| 2002/0140680 | A1* | 10/2002 | Lu ......................... | G06F 1/1626 345/169 |
| 2002/0163507 | A1* | 11/2002 | Kao ....................... | G06F 3/0488 345/173 |
| 2005/0024341 | A1* | 2/2005 | Gillespie ............... | G06F 1/1616 345/173 |
| 2005/0046621 | A1* | 3/2005 | Kaikuranta ........... | G06F 3/03547 345/173 |

(Continued)

OTHER PUBLICATIONS

ThumbSpace: Generalized One-Handed Input for Touchscreen-Based Mobile Devices, Karlson et. al, Human-Computer Interaction Lab, Department of Computer Science, University of Maryland, 2006 (Thumbspace).*

*Primary Examiner* — Nathan Shrewsbury
(74) *Attorney, Agent, or Firm* — Jianq Chyun IP Office (57) ABSTRACT

A method for operating a user interface and an electronic device using the method are provided. The electronic device has a touch screen that displays the user interface, and the user interface includes at least one operable object. The method includes: detecting a first touch through a sensor located on a side of the touch screen to obtain a first touch signal corresponding to the first touch; if the first touch signal continuously exists, detecting a second touch through the touch screen to obtain a second touch signal corresponding to the second touch; determining a target region on the user interface according to the first touch signal and the second touch signal; moving the at least one operable object in the target region to a specific region on the user interface at a specific speed.

8 Claims, 9 Drawing Sheets

(56) References Cited

U.S. PATENT DOCUMENTS

| | | | |
|---|---|---|---|
| 2006/0022955 A1* | 2/2006 | Kennedy | G06F 3/0414 345/173 |
| 2006/0026521 A1* | 2/2006 | Hotelling | G06F 3/0418 715/702 |
| 2007/0236460 A1* | 10/2007 | Young | G06F 3/04886 345/169 |
| 2008/0165141 A1* | 7/2008 | Christie | G06F 3/044 345/173 |
| 2008/0180405 A1* | 7/2008 | Han | G06F 3/04883 345/173 |
| 2009/0058821 A1* | 3/2009 | Chaudhri | G06F 3/04817 345/173 |
| 2009/0079699 A1* | 3/2009 | Sun | G06F 3/0488 345/173 |
| 2009/0195518 A1* | 8/2009 | Mattice | G06F 3/0416 345/177 |
| 2009/0228825 A1* | 9/2009 | Van Os | G06F 3/0488 715/780 |
| 2009/0322695 A1* | 12/2009 | Cho | G06F 3/0416 345/173 |
| 2009/0327975 A1* | 12/2009 | Stedman | G06F 3/0416 715/863 |
| 2010/0097331 A1* | 4/2010 | Wu | G06F 3/0488 345/173 |
| 2010/0105443 A1* | 4/2010 | Vaisanen | G06F 3/0486 455/566 |
| 2010/0134423 A1* | 6/2010 | Brisebois | G06F 3/03547 345/173 |
| 2010/0192109 A1* | 7/2010 | Westerman | G06F 3/04883 715/863 |
| 2010/0231550 A1* | 9/2010 | Cruz-Hernandez | G06F 3/0488 345/174 |
| 2011/0050607 A1* | 3/2011 | Park | G06F 3/0418 345/173 |
| 2011/0060986 A1* | 3/2011 | Yang | G06F 3/04845 715/702 |
| 2011/0069018 A1* | 3/2011 | Atkins | G06F 3/0416 345/173 |
| 2011/0163981 A1* | 7/2011 | Ito | G06F 3/04883 345/173 |
| 2011/0227947 A1* | 9/2011 | Benko | G06F 3/03543 345/650 |
| 2011/0258555 A1* | 10/2011 | Lee | G06F 9/4443 715/744 |
| 2011/0302532 A1* | 12/2011 | Missig | G06F 3/0416 715/823 |
| 2012/0054674 A1* | 3/2012 | Beykpour | G06F 3/0481 715/788 |
| 2012/0154328 A1* | 6/2012 | Kono | G06F 3/016 345/174 |
| 2012/0174026 A1* | 7/2012 | Shim | G06F 3/0488 715/784 |
| 2012/0182238 A1* | 7/2012 | Lee | G06F 3/0418 345/173 |
| 2012/0218215 A1* | 8/2012 | Kleinert | G06F 3/0418 345/173 |
| 2012/0299849 A1* | 11/2012 | Homma | G06F 3/0488 345/173 |
| 2012/0306773 A1* | 12/2012 | Yeung | G06F 1/1616 345/173 |
| 2013/0038555 A1* | 2/2013 | Maeda | G06F 3/04883 345/173 |
| 2013/0069860 A1* | 3/2013 | Davidson | G06F 3/0416 345/156 |
| 2013/0181918 A1* | 7/2013 | Ting | G06F 3/04817 345/173 |
| 2013/0234957 A1* | 9/2013 | Shirato | G06F 3/0416 345/173 |
| 2013/0241847 A1* | 9/2013 | Shaffer | G06F 3/038 345/173 |
| 2013/0257769 A1* | 10/2013 | Sheik-Nainar | G06F 3/04883 345/173 |
| 2014/0049483 A1* | 2/2014 | Kim | G06F 3/0488 345/173 |
| 2014/0101579 A1* | 4/2014 | Kim | G06F 3/0486 715/761 |
| 2014/0152599 A1* | 6/2014 | Lee | G06F 3/017 345/173 |
| 2014/0173484 A1* | 6/2014 | Hicks | G06F 3/0486 715/769 |
| 2014/0176455 A1* | 6/2014 | Araki | G06F 3/016 345/173 |
| 2014/0195936 A1* | 7/2014 | Cragun | G06F 3/0488 715/763 |
| 2014/0267873 A1* | 9/2014 | Kokufu | H04N 5/23216 348/333.11 |
| 2015/0103001 A1* | 4/2015 | Li | G06F 3/0486 345/157 |
| 2016/0034177 A1* | 2/2016 | Westerman | G06F 3/04883 715/769 |

\* cited by examiner

METHOD FOR OPERATING USER INTERFACE AND ELECTRONIC DEVICE THEREOF

CROSS-REFERENCE TO RELATED APPLICATION

This application claims the priority benefit of Taiwan application serial no. 102143485, filed on Nov. 28, 2013. The entirety of the above-mentioned patent application is hereby incorporated by reference herein and made a part of this specification.

Field of the Invention

The invention relates to a method for operating a user interface. More particularly, the invention relates to a method for operating a user interface and an electronic device that employs such a method.

Description of Related Art

With the maturation of the touch panel-related technologies and the reduction of the manufacturing costs of large-size panels, the sizes of touch screens of mobile devices tend to be expanded. Said size expansion may however cause inconvenience to users while they are using the mobile devices. For instance, if a user takes a bus or the mass rapid transportation (MRT), the user is merely able to hold and use the mobile device with one hand because he or she needs to hold the pull ring on the bus or the MRT with the other hand.

At this time, provided that the touch screen of the mobile device is oversized, the locations of certain application shortcuts on the user interface of the mobile device are beyond the range within which the user's finger may move, and thus the user is inescapably required to stop using the application or touch the application shortcuts with the other hand that holds the pull ring at first, which significantly inconveniences the user.

SUMMARY OF THE INVENTION

The invention is directed to a method for operating a user interface and an electronic device, so as to effectively resolve the conventional issue regarding the inconvenient use of the electronic device with the large-size touch screen.

In an embodiment of the invention, a method for operating a user interface is provided, and the method is adapted to an electronic device having a touch screen. The touch screen displays the user interface that includes at least one operable object. The method includes: detecting a first touch through a sensor located on one side of the touch screen to obtain a first touch signal corresponding to the first touch; if the first touch signal continuously exists, detecting a second touch through the touch screen to obtain a second touch signal corresponding to the second touch; determining a target region on the user interface according to the first touch signal and the second touch signal; moving the at least one operable object in the target region to a specific region on the user interface at a specific speed.

In another embodiment of the invention, an electronic device that includes a touch screen, a sensor, and a processor is provided. The touch screen is configured to display a user interface that includes at least one operable object. The sensor is located on one side of the touch screen. The processor is coupled to the touch screen and the sensor. The processor is configured to obtain a first touch signal corresponding to the first touch according to the first touch detected by the sensor. If the first touch signal continuously exists, the processor is further configured to obtain a second touch signal corresponding to the second touch according to the second touch detected by the touch screen. The processor is further configured to determine a target region on the user interface according to the first touch signal and the second touch signal and move the at least one operable object in the target region to a specific region on the user interface at a specific speed.

In view of the above, when a user holds the electronic device with one hand or both hands, the user inevitably presses the sensor located on the side of the touch screen. After that, the user simply touches the touch screen to move the operable object on the touch screen to a location where the user's finger can touch, and thereby the conventional issue regarding the inconvenient use of the electronic device with the large-size touch screen can be effectively resolved.

Several exemplary embodiments accompanied with figures are described in detail below to further describe the invention in details.

DETAILED DESCRIPTION OF DISCLOSED EMBODIMENTS

Figure 1:
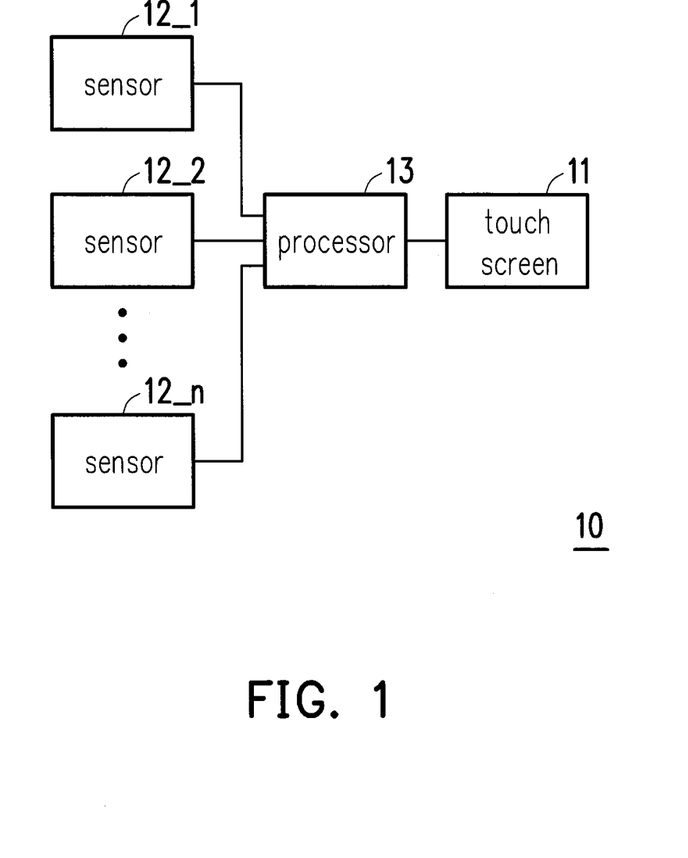
FIG. 1 and FIG. 2 are schematic views illustrating an electronic device according to an embodiment of the invention.
Figure 2:
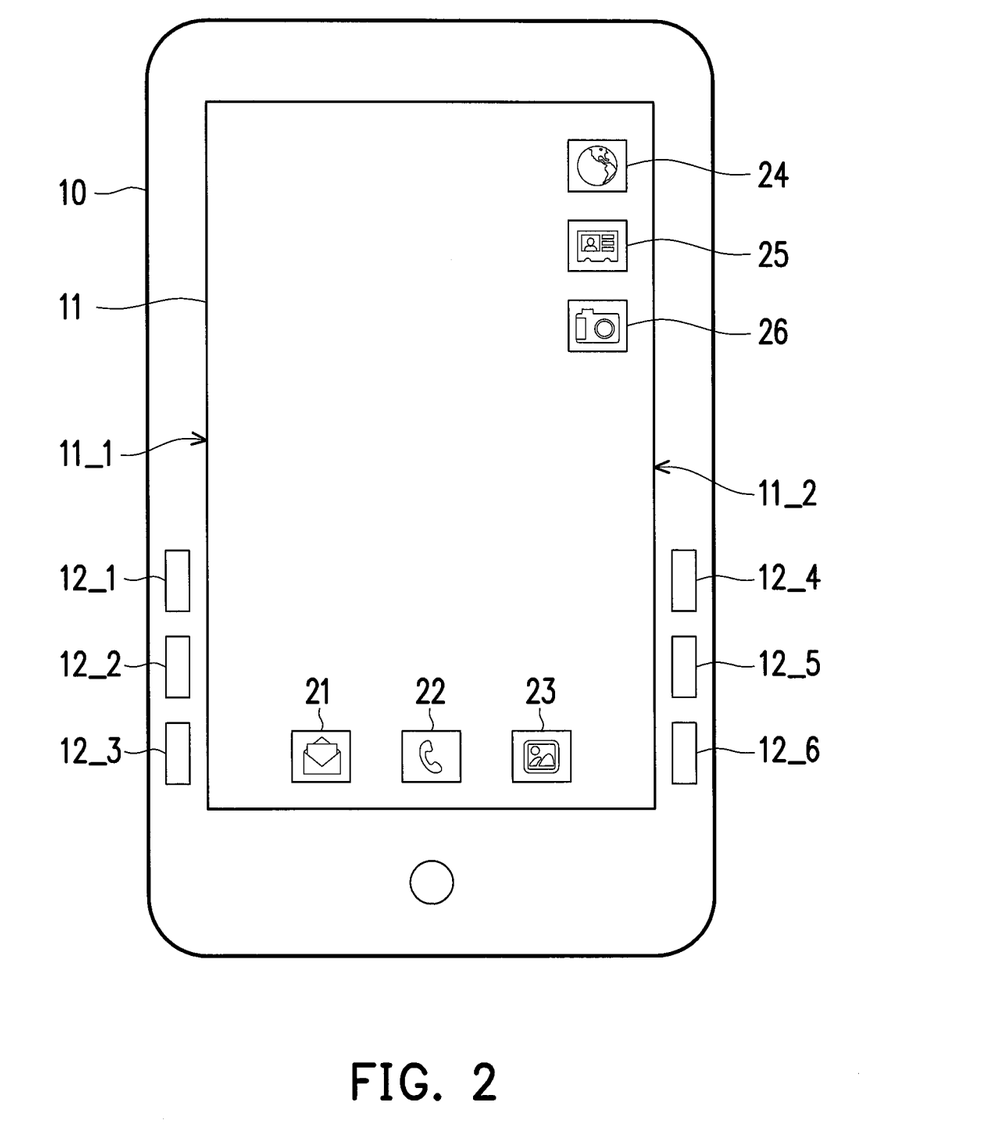

FIG. 1 and FIG. 2 are schematic views illustrating an electronic device according to an embodiment of the invention.

With reference to FIG. 1 and FIG. 2, the electronic device 10 includes a touch screen 11, sensors 12_1 to 12_n, and a processor 13.

The touch screen 11 includes a resistive touch panel, a capacitive touch panel, an optical touch panel, an acoustic wave touch panel, an electromagnetic touch panel, or any other touch screen capable of performing both the touch function and the display function, for instance.

The sensors 12_1 to 12_n are, for instance, grip sensors or other sensors capable of performing the pressure-sensing function. The sensors 12_1 to 12_n may also be proximity sensors and/or light sensors that may be applied to simply sense an approaching action of an object. In the present embodiment, the number of the sensors 12_1 to 12_n is 6 (i.e., n=6). The sensors 12_1 to 12_3 are located on a side 11_1 of the touch screen 11, and the sensors 12_4 to 12_6 are located on a side 11_2 of the touch screen 11.

It should be mentioned that FIG. 2 merely illustrates one exemplary embodiment, and the number and the actual arrangement of the sensors 12_1 to 12_n are not limited in the invention. For instance, in an embodiment of the invention, the sensors 12_1 to 12_6 may be distributed more dispersedly or densely, and the number of the sensors 12_1 to 12_6 may be more or may be less. According to an exemplary embodiment, the sensor located on the side 11_1 of the touch screen 11 may merely be the sensor 12_2, and the sensor located on the side 11_2 of the touch screen 11 may merely be the sensor 12_5. Alternatively, sensors may be arranged merely on the side 11_1 or 11_2 of the touch screen 11. In another embodiment of the invention, the sensors 12_1 to 12_n may be respectively arranged on more than one side or on all four sides of the touch screen 11.

The processor 13 is coupled to the touch screen 11 and the sensors 12_1 to 12_n. Here, the processor 13 is, for instance, a central processing unit (CPU), a micro-processor, an embedded controller, or a chip/chip set capable of processing and calculating data. The processor 13 is able to run at least one operating system (OS) and control the touch screen 11 to display the user interface that includes at least one operable object. A user may click or slide the touch screen 11 or perform another input action on the touch screen 11 through an input medium (e.g., a finger or a stylus), and the processor 130 may generate an input command corresponding to the input action detected by the touch screen 11 and operate the user interface. The user interface described herein refers to a user interface of an electronic device 10 in a normal operating mode or a screen-unlock mode. Besides, in an embodiment of the invention, the user interface also includes a screen-lock frame when the electronic device 10 is in a screen-lock mode, which should however not be construed as a limitation to the invention. In addition, the operable object described herein includes a shortcut of an application, a window, a message box, a function box, or any other object that may be operated by users.

As exemplary shown in FIG. 2, the user interface includes application shortcuts 21 to 26. If a user selects (e.g., by clicking) one of the application shortcuts 21 to 26, the application corresponding to the selected shortcut is executed or activated. The executed or activated application may run in the foreground and displayed in form of an execution or activation image; alternatively, the application may be executed or activated in the background. Besides, the locations of the application shortcuts 21 to 26 on the user interface may be determined by default or by the user.

Figure 3:
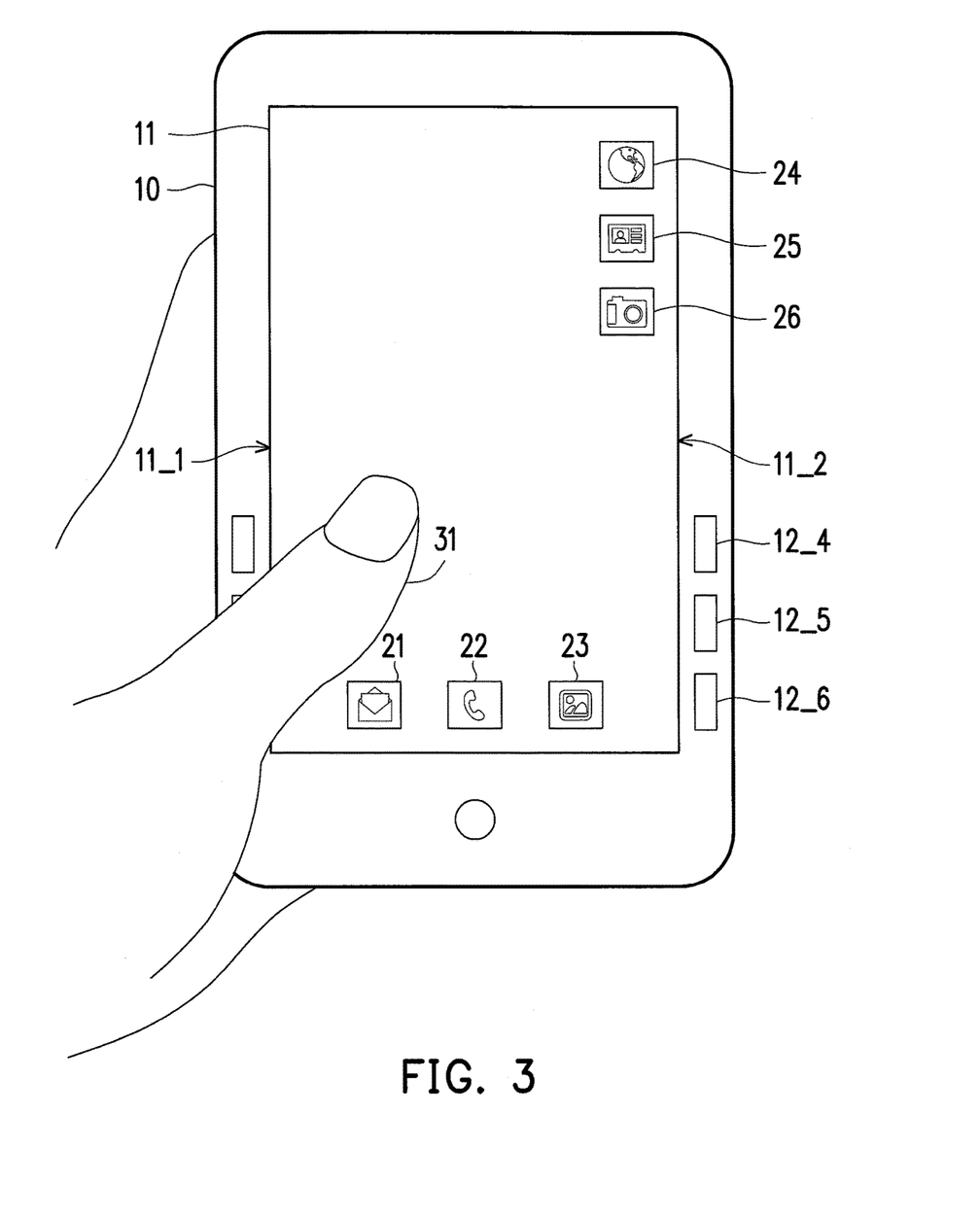
FIG. 3 is a schematic view illustrating a scenario of use according to an embodiment of the invention.

FIG. 3 is a schematic view illustrating a scenario of use according to an embodiment of the invention.

With reference to FIG. 3, it is assumed that the user holds the electronic device 10 with his or her left hand and simultaneously operates the user interface displayed on the touch screen 11 with his or her left thumb 31. If the size (e.g., the length and/or the width) of the touch screen 11 exceeds the length of the left thumb 31 of the user to a great extent, the left thumb 31 of the user can barely touch the application shortcuts 23 to 26 that are far away from the left thumb 31 of the user or located within a region that cannot be touched by the thumb 31. At this time, if any of the application shortcuts 23 to 26 need be clicked, the other hand of the user is required for clicking the application shortcuts 23 to 26 in most cases. However, if the user is not allowed to operate the touch screen 11 with both hands, the user needs to stretch his or her left thumb 31 as much as possible, so as to click the application shortcuts 23 to 26. Thereby, the user is very much likely to drop the electronic device 10; although the left thumb 31 of the user may finally be forced to touch one of the application shortcuts 23 to 26, the palm of the user covering the application shortcuts 21 and 22 may execute or activate the applications corresponding to the application shortcuts 21 and 22 unintentionally, or any other erroneous and unexpected touch may occur.

To resolve said issue, the processor 13 described in the present embodiment obtains a touch signal (hereinafter referred to as the first touch signal) corresponding to a touch (hereinafter referred to as the first touch) according to the first touch detected by a sensor (e.g., the sensor 12_2) located on a side of the touch screen 11. If the first touch signal continuously exists, i.e., if the sensor (e.g., the sensor 12_2) continuously senses the first touch, the processor 13 is further configured to obtain another touch signal (hereinafter referred to as the second touch signal) corresponding to another touch (hereinafter referred to as the second touch) on the touch screen 11 according to the second touch detected by the touch screen 11. The first touch and the second touch may be generated by an input tool (e.g., a finger of the user) that is in full contact with the touch screen and/or the sensors 12_1 to 12_n or approaches the touch screen and/or the sensors 12_1 to 12_n (e.g., hovering sensing), which should not be construed as a limitation to the invention. According to the first touch signal and the second touch signal, the processor 13 determines a target region on the user interface displayed on the touch screen 11.

Figure 4:
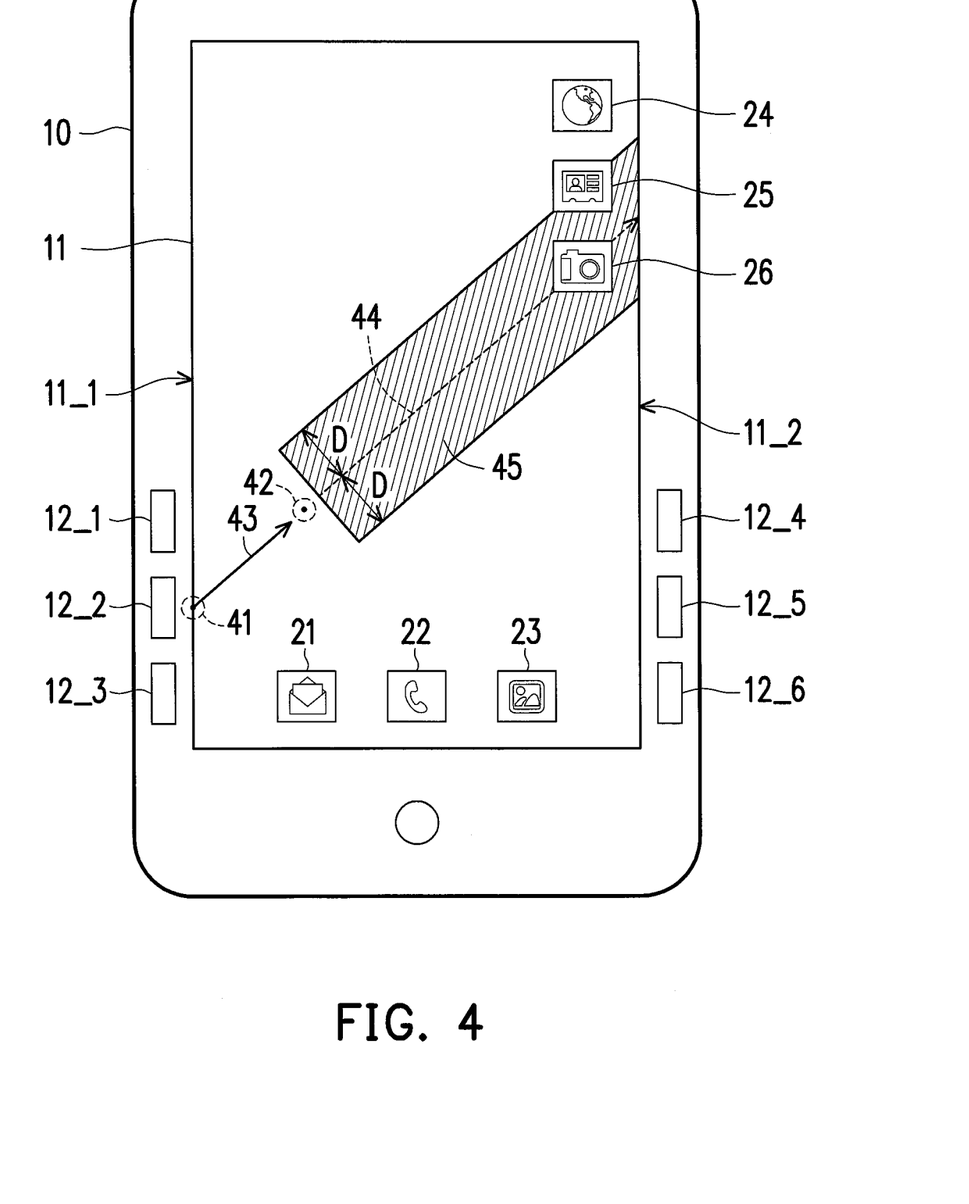
FIG. 4 is a schematic diagram of obtaining a target region according to an embodiment of the invention.

FIG. 4 is a schematic diagram of obtaining a target region according to an embodiment of the invention.

With reference to FIG. 3 and FIG. 4, when the user holds the electronic device 10 with his or her left hand, the left palm or a portion of the left thumb 31 of the user is extremely close to, touches, or presses at least parts of the sensors 12_1 to 12_3. For instance, if the first touch is sufficient to drive the sensor 122, e.g., if the press force of the first touch is greater than a threshold, or if the distance from the palm or the left thumb 31 of the user to the sensor 12_2 is shorter than a distance threshold, the sensor 12_2 sends a first touch signal corresponding to the first touch to the processor 13.

If the sensor 12_2 continuously sends the first touch signal corresponding to the first touch to the processor 13, and the left thumb 31 of the user touches or is in the proximity of the touch surface of the touch screen 11, the touch screen 11 detects the second touch and sends the second touch signal corresponding to the second touch to the processor 13. Here, the first touch signal corresponds to a first touch position, and the second touch signal corresponds to a second touch position. The first touch position and the second touch position are respectively obtained by analyzing the first touch signal and the second touch signal by the processor 13, for instance. After that, the processor 13 may express the first touch position and the second touch position respectively as a coordinate location on the touch screen 11 or on any x-y plane, given that the location of the touch position is clearly demonstrated.

For instance, the processor 13 may express the first touch position and the second touch position respectively as a touch point 41 and a touch point 42, and the touch point 41 and the touch point 42 respectively have a coordinate location (X1, Y1) and a coordinate location (X2, Y2) on the touch screen 11. Since the sensor 12_2 is located on the side 11_1 of the touch screen 11, and the coordinate location (X1, Y1) of the touch point 41 serves to represent the touch that occurs on the side 11_1 of the touch screen 11, the processor 13 may also set X1 of the coordinate location (X1, Y1) of the touch point 41 as the default value (e.g., 0) of the x coordinate, and Y1 corresponds to the location of the sensor 12_2 on the side 11_1 of the touch screen 11. That is, as shown in FIG. 2, the touch signals sent by the sensors 12_1 to 12_3 respectively correspond to the same X1 but different Y1s, for instance, which is determined by the actual locations of the sensors 12_1 to 12_3 on the side 11_1 of the touch screen 11.

According to the first touch position and the second touch position, the processor 13 may obtain a base direction. For instance, the processor 13 may obtain the base direction 43 according to the coordinate location (X1, Y1) of the touch point 41 and the coordinate location (X2, Y2) of the touch point 42, and the base direction 43 is represented by a vector direction (X2-X1, Y2-Y1), for instance. The processor 13 may then obtain the target region by extending by a distance toward the base direction from the second touch position on the user interface displayed on the touch screen 11. For instance, the processor 13 may start from the coordinate location (X2, Y2) of the touch point 42 and extend to the side 11_2 of the touch screen 11 along the base direction 43, and the extension path is set as the target region. Namely, in an embodiment of the invention, the target region refers to the coverage area of a straight line 44 extending from the coordinate location (X2, Y2) of the touch point 42 toward the vector direction (X2 X1, Y2-Y1), for instance.

The processor 13 then determines whether the coverage area of the straight line 44 includes the operable object. For instance, the processor 13 may read the coordinates of all of the operable objects on the user interface from a database and compare the coordinates of the operable objects with all of the coordinate locations covered by the straight line 44. If the coordinate of any of the operable objects is overlapped with or close to one of the coordinate locations covered by the straight line 44, the processor 13 determines that the operable object is located within the coverage area of the straight line 44. For instance, as shown in FIG. 4, the application shortcut 26 is located on the straight line 44, and therefore the processor 13 determines that the application shortcut 26 is in the target region.

Besides, the processor 13 described in an embodiment of the invention may also expand the coverage area of the straight line 44 in the normal vector direction from the straight line 44 to the left and the right by a distance D, respectively, so as to form the expanded target region 45. Since parts or all of the application shortcuts 25 and 26 are located within the target region 45, the processor 13 determines that the application shortcuts 25 and 26 are in the target region.

Figure 5:
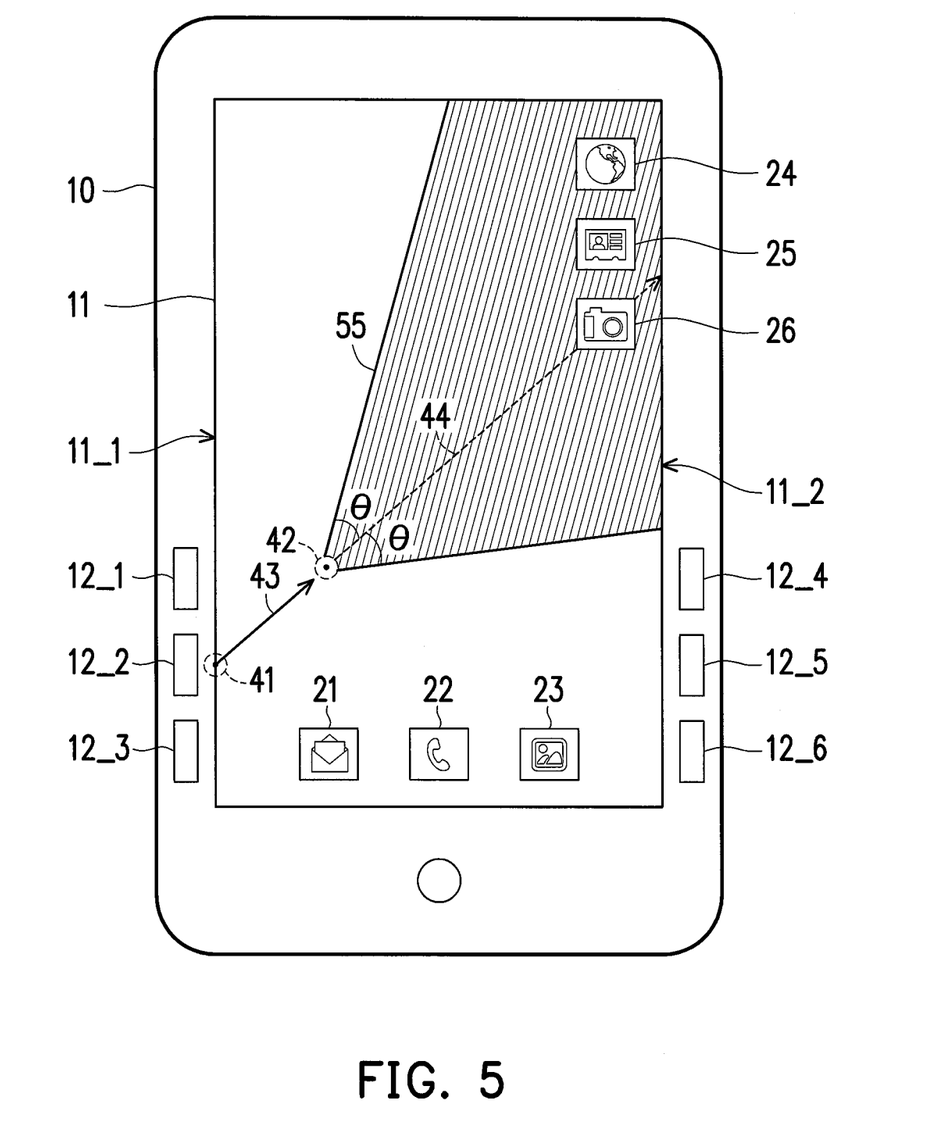
FIG. 5 is a schematic diagram of obtaining a target region according to an embodiment of the invention.

FIG. 5 is a schematic diagram of obtaining a target region according to an embodiment of the invention.

With reference to FIG. 5, after the straight line 44 is obtained, the processor 13 may further obtain a fan-like target region 55 based on the straight line 44. Two side edges of the target region 55 are defined by extending outwardly from the touch point 42, and there is an included angle θ between the straight line 44 and the two side edges of the target region 55. Thereby, the application shortcuts 24 to 26 are partially or all included in the fan-like target region 55.

That is, if the first touch position (e.g., the touch point 41) and the second touch position (e.g., the touch point 42) are spaced by a first distance, and the first touch position (e.g., the touch point 41) and the target region are spaced by a second distance, the second distance is greater than or equal to the first distance. If the second distance is smaller than the first distance, it indicates that the location of the operable object allows the user to touch the operable object, and thus it is not necessary to move the operable object. Practically, the shape and the coverage area of the target region may both be adjusted according to actual requirements and are not limited to those described above.

After the target region is determined, and the processor 13 determines that at least one operable object is included in the target region, the processor 13 defines a specific region on the user interface. For instance, the processor 13 may set a region where the second touch position is located or a region surrounding the second touch position as the specific region. The processor 13 then moves the operable object in the target region to the specific region at a specific speed.

Figure 6:
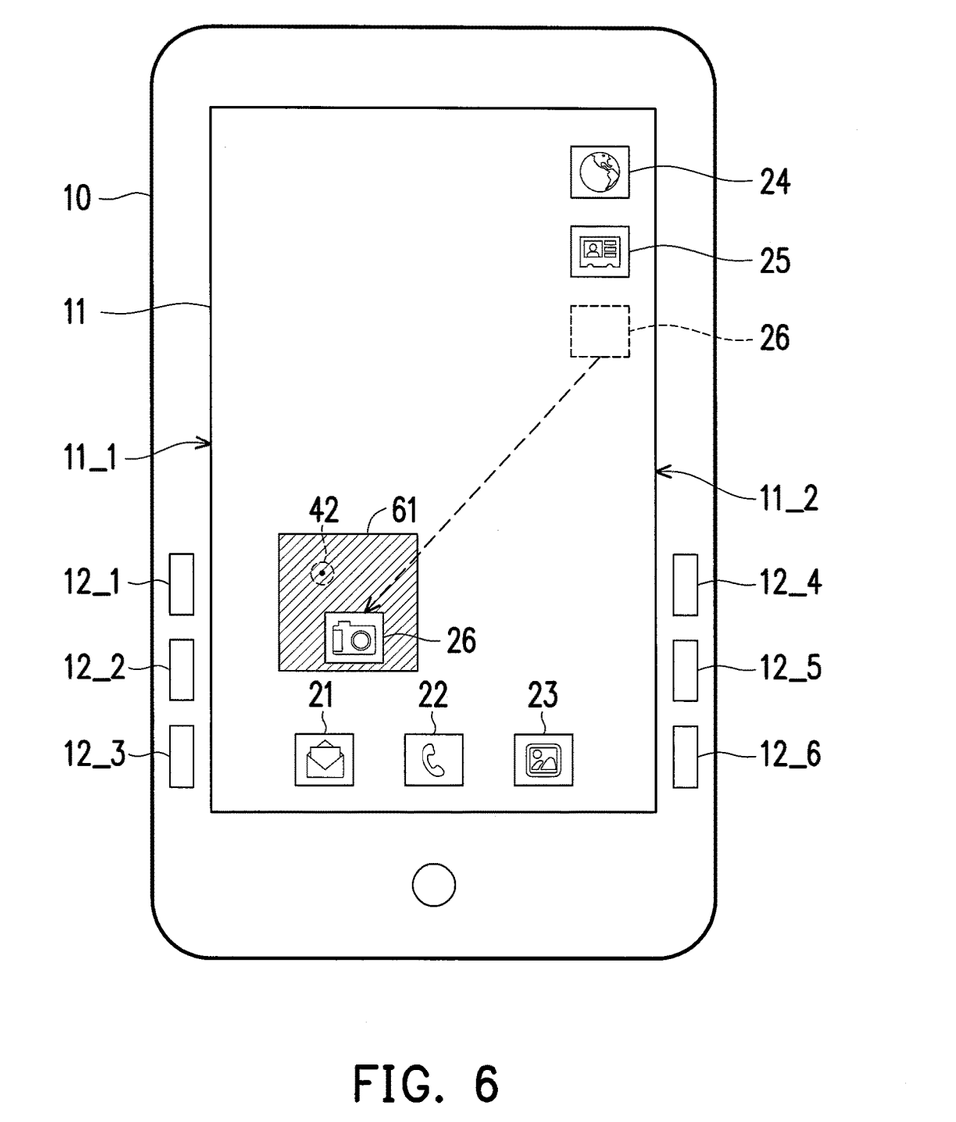
FIG. 6 is a schematic diagram of moving an operable object to a specific region according to an embodiment of the invention.

FIG. 6 is a schematic diagram of moving an operable object to a specific region according to an embodiment of the invention.

With reference to FIG. 6, the processor 13 sets a region where the touch point 42 (i.e., the second touch position) is located as the specific region 61. The shape of the specific region 61 may be circular or rectangular, which should however not be construed as a limitation to the invention. That is, the specific region 61 described herein includes the touch point 42 (i.e., the second touch position). Given that the processor 13 already determines that the application shortcut 26 is located in the target region, the processor 13 moves the application shortcut 26 to any location in the specific region 61 at a specific speed. In an embodiment of the invention, the processor 13 moves the application shortcut 26 to the coordinate location of the touch point 42; thereby, after the user moves his or her finger away from the touch point 42, the user is allowed to directly click the application shortcut 26 at the same location of the touch point 42.

Figure 7:
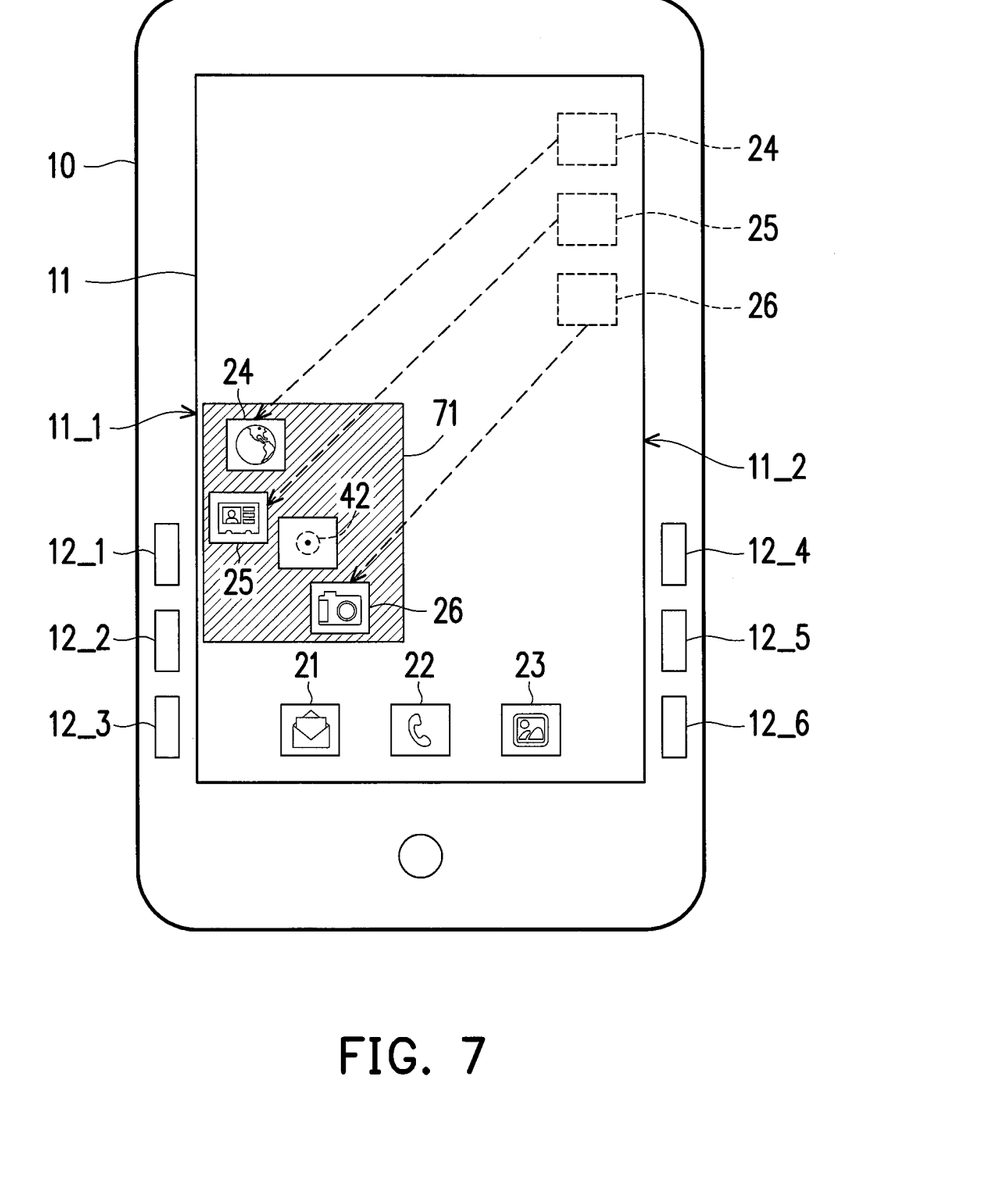
FIG. 7 is a schematic diagram of moving an operable object to a specific region according to an embodiment of the invention.

FIG. 7 is a schematic diagram of moving an operable object to a specific region according to an embodiment of the invention.

With reference to FIG. 7, in the present embodiment, the processor 13 defines a ring-shaped region surrounding the touch point 42 and sets the ring-shaped region as the specific region 71. Given that the processor 13 already determines that the application shortcuts 24 to 26 are all located in the target region, the processor 13 moves the application shortcuts 24 to 26 to any location in the specific region 71 at a specific speed. Specifically, the specific region 71 does not include the touch point 42; therefore, while the processor 13 moves the application shortcuts 24 to 26 to the specific region 71 or after the processor 13 moves the application shortcuts 24 to 26 to the specific region 71, even though the user's finger has not been moved away from the touch point 42, the user is able to clearly observe the application shortcuts 24 to 26 that are moved and thus can be easily clicked, and the moved application shortcuts 24 to 26 are not concealed by the user's finger.

Besides, after the operable object is moved to the specific region, the user may continue to touch another position on the touch screen 11, such that the touch screen 11 may generate the new second touch signal, and the processor 13 moves the corresponding operable object to the specific region corresponding to the second touch signal according to the first touch signal and the second touch signal. As such, even though the user fails to move the operable object that is intended to be moved in the beginning, the user may move other operable objects by correcting the second touch position. Additionally, after the processor 13 receives the new second touch signal, the processor 13 may also restore the operable object (that is moved according to the previous second touch signal) back to the original location, such that the operable objects are not accumulated in the specific region.

The specific region may also be a region around the sensor that generates the first touch signal. For instance, a lower-left corner of the touch screen 11 (where the sensor 12_2 is located) is set as the specific region, so as to ensure that the user is able to easily click the moved operable object.

After detecting the first touch, some sensors (e.g., the grip sensors) may further include a force parameter in the first touch signal, so as to inform the processor 13 of information associated with the press force of the first touch. For instance, the value of the force parameter may be positively correlated with the press force of the first touch. The greater the press force of the first touch, the greater the value of the force parameter; the smaller the press force of the first touch, the smaller the value of the force parameter. Hence, if the first touch signal continuously exists, the processor 13 may adjust at least one of the target region, the number of the at least one to-be-moved operable object in the target region, the specific speed, and the specific region according to the force parameter.

For instance, the processor 13 may adjust the coverage area of the target region according to the force parameter. As shown in FIG. 4, the processor 13 may adjust the extension length of the straight line 44 and/or the distance D according to the force parameter. For instance, if the force parameter indicates that the press force exerted by the user on the sensor 12_2 increases, the processor 13 may increase the extension length of the straight line 44 and/or the distance D; if the force parameter indicates that the press force exerted by the user on the sensor 12_2 decreases, the processor 13 may reduce the extension length of the straight line 44 and/or the distance D. Alternatively, as shown in FIG. 5, the processor 13 may adjust the extension length of the straight line 44 and/or the included angle θ according to the force parameter. For instance, if the force parameter indicates that the press force exerted by the user on the sensor 12_2 increases, the processor 13 may increase the extension length of the straight line 44 and/or the included angle θ; if the force parameter indicates that the press force exerted by the user on the sensor 12_2 decreases, the processor 13 may reduce the extension length of the straight line 44 and/or the included angle θ. The processor 13 may also change the shape of the target region according to the force parameter. For instance, if the force parameter indicates that the press force exerted by the user on the sensor 12_2 increases, the processor 13 changes the shape of the target region from the straight line 44 to the shape of the target region shown in FIG. 4 or FIG. 5. After the coverage area and/or the shape of the target region is changed, the number of the operable objects in the target region may also be changed, and thus the number of the operable, to-be-moved object in the target region is adjustable.

The processor 13 may also adjust the specific speed according to the force parameter. For instance, in the process of moving the operable object in the specific region, if the force parameter indicates that the press force exerted by the user on the sensor 12_2 increases, the processor 13 may accelerate the specific speed, so as to expedite the movement of the operable object; if the force parameter indicates that the press force exerted by the user on the sensor 12_2 decreases, the processor 13 may reduce the specific speed, so as to slow down the movement of the operable object. According to an embodiment of the invention, the processor 13 may obtain the specific speed of moving each operable object by applying the following equation (1):

$$V=((P/P'))\times d/s \qquad (1),$$

wherein V is the specific speed, p is the force parameter or the value of the press force sensed by the sensor 12_2, P' is the maximum force parameter or the maximum value of the press force sensed by the sensor 12_2, d is a distance from the to-be-moved operable object to the specific region (or a specific position in the specific region), and s is the estimated time frame during which the operable object is moved.

The processor 13 may also adjust the specific region according to the force parameter. For instance, if the user discovers that he or she cannot easily click or touch the operable object that is already moved to the specific region, the user may strengthen the press force exerted on the sensor 12_2, and the processor 13 may then move the operable object in the specific region toward the sensor 12_2 or move the specific region together with the operable object therein toward the sensor 122, such that the user is allowed to operate the operable object after it is moved.

The force parameter may also serve as a basis on which the processor 13 determines whether to move the operable object to the specific region or not. For instance, if the force parameter indicates that the press force exerted on the sensor 12_2 exceeds an activation value, the processor 13 moves the operable object to the specific region. Alternatively, the processor 13 may set an activation image on the user interface, and the processor 13 moves the operable object to the specific region only if the activation image is triggered (e.g., by clicking). Such an activation image may be replaced by a physical button configured on the electronic device 10. Thereby, the user is allowed to easily determine the time of controlling the processor 13 to move the operable object to the specific region, and thereby the user is not hindered from performing other operations.

If the operable object described herein is a window, a message box, or a function box, the processor 13 not only may move the operable object but also may adjust the size and/or the brightness of the operable object according to the force parameter. For instance, after obtaining a window object in the target region, the processor 13 may adjust the length and/or the width of the window object according to the press force indicated by the force parameter. Alternatively, the processor 13 may also darken or lighten the color (e.g., increase the transparency) of the window object according to the force parameter.

Said mechanisms of adjustment are based on the force parameter, and the processor 13 also allows the user to determine or select the mode of adjustment. For instance, the processor 13 may display an operating panel on the user interface. The operating panel includes a plurality of adjustment images, each of which corresponds to one of the above-mentioned mechanisms of adjustment, for instance. When the user selects an adjustment image corresponding to the adjustment of the target region, an adjustment image corresponding to the adjustment of the number of the at least one operable, to-be-moved object in the target region, an adjustment image corresponding to the adjustment of the specific speed, an adjustment image corresponding to the adjustment of the specific region, or an adjustment image corresponding to the adjustment of the window object on the operating panel, the processor 13 executes the operation corresponding to the selected adjustment image, and thereby the user is allowed to easily and conveniently operate the electronic device 10.

Figure 8:
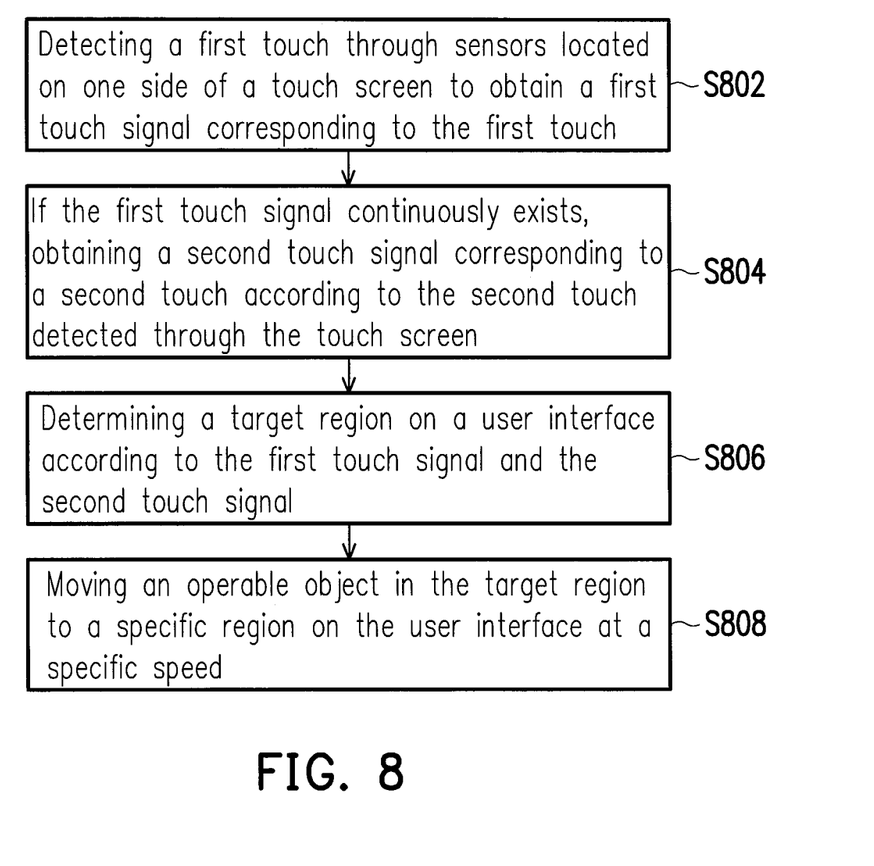
FIG. 8 is a flowchart of operating a user interface according to an embodiment of the invention.

FIG. 8 is a flowchart of operating a user interface according to an embodiment of the invention.

With reference to FIG. 1 and FIG. 8, in step S802, the processor 13 detects a first touch through the sensors 12_1 to 12_n located on one side of the touch screen 11 to obtain a first touch signal corresponding to the first touch. In step S804, if the first touch signal continuously exists, the processor 13 further obtains a second touch signal corresponding to the second touch according to the second touch detected by the touch screen 11. In step S806, the processor 13 determines a target region on the user interface displayed on the touch screen 11 according to the first touch signal and the second touch signal. In step S808, the processor 13 moves the operable object in the target region to a specific region on the user interface at a specific speed.

It should be mentioned that the processor 13 described in an embodiment of the invention may include one or more hardware circuit, so as to perform the functions described in the previous embodiments. Alternatively, in an embodiment of the invention, at least one software or firmware module is stored in a storage medium (e.g., a hard drive or a memory) of the electronic device 10, and the processor 13 is able to load (from the storage medium of the electronic device 10) and run the at least one software or firmware module, such that the steps in the method provided in the previous embodiments may be performed.

Besides, according to an embodiment of the invention, if no additional sensor is intended to be configured around the touch screen of the electronic device in consideration of costs, said functions may be performed with use of the touch screen.

Figure 9:
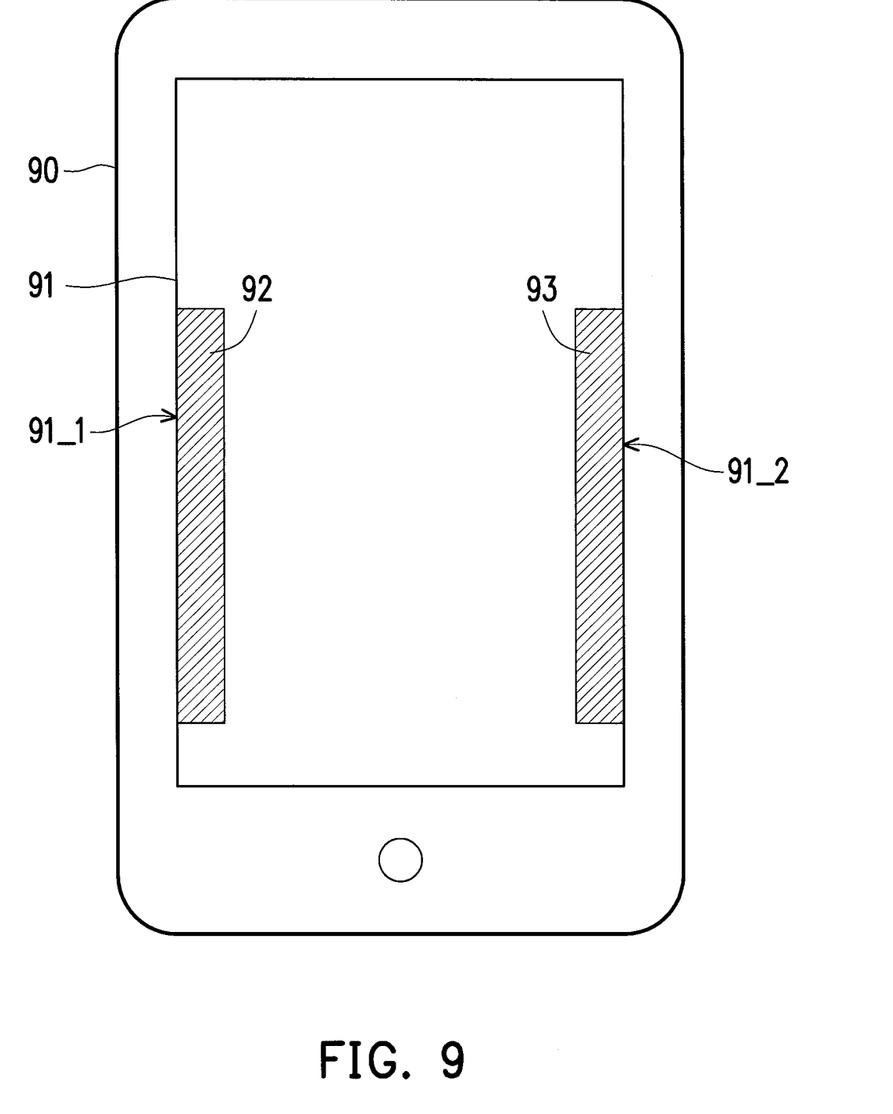
FIG. 9 is a schematic view illustrating an electronic device according to an embodiment of the invention.

FIG. 9 is a schematic view illustrating an electronic device according to an embodiment of the invention.

With reference to FIG. 9, the electronic device 90 at least includes a touch screen 91 and a processor (not shown), and the processors of the electronic device 90, the touch screen 91, and the processor of the electronic device 90 are respectively similar to the electronic device 10, the touch screen 11, and the processor 13.

In the present embodiment, neither the sensors 12_1 to 12_n nor any other similar sensor is configured around the touch screen 91, or the sensors 12_1 to 12_n are assigned to perform other functions or tasks. Hence, the processor of the electronic device 90 may define at least one first touch region on the user interface displayed on the touch screen 91. For instance, a first touch region 92 may be defined to be located adjacent to the side 91_1 of the touch screen 91 that displays the user interface, and/or a first touch region 93 may be defined to be located adjacent to the side 91_2 of the touch screen 91 that displays the user interface. The processor of the electronic device 90 considers all touches occurring in the first touch region as the first touches and considers all touch signals corresponding to the first touches as the first touch signals. Besides, the processor of the electronic device 90 may consider the regions outside the first touch region (e.g., the first touch regions 92 and 93) on the user interface as the second touch regions and consider all clicks or touches occurring in the second touch regions as the second touches. Other implementations of the electronic device are identical or similar to those provided in the previous embodiments and thus will not be further explained hereinafter.

To sum up, when a user holds the electronic device with one hand or both hands, the user inevitably presses the side of the touch screen or the sensor located on the side of the touch screen. After that, the user simply touches the touch screen to move the operable object on the touch screen to a location where the user's finger can touch, and thereby the conventional issue regarding the inconvenient use of the electronic device with the large-size touch screen can be effectively resolved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A method for operating a user interface, the method being adapted to an electronic device having a touch screen, the touch screen displaying the user interface comprising at least one operable object, the method comprising:
   detecting a first touch by a sensor located on one side of the touch screen to obtain a first touch signal corresponding to the first touch;
   if the first touch signal continuously exists, detecting a second touch through the touch screen to obtain a second touch signal corresponding to the second touch, wherein the first touch signal corresponds to a first touch position, and the second touch signal corresponds to a second touch position;
   obtaining a base direction according to the first touch position and the second touch position;
   obtaining a target region by extending by a distance toward the base direction from the second touch position on the user interface;
   determining whether the at least one operable object is located within the target region;
   moving the at least one operable object in the target region to a specific region on the user interface at a specific speed if it is determined that the at least one operable object is located within the target region; and
   maintaining the at least one operable object at an original location on the user interface if it is determined that the at least one operable object is not located within the target region,
   wherein a distance between the at least one operable object and the second touch position before the at least one operable object is moved is greater than a distance between the at least one operable object and the second touch position after the at least one operable object is moved.

2. The method as recited in claim 1, wherein a first distance is between the first touch position and the second touch position, a second distance is between the first touch position and the target region, and the second distance is greater than the first distance.

3. The method as recited in claim 1, wherein before the step of moving the at least one operable object in the target region to the specific region on the user interface at the specific speed, the method further comprises:
   setting a region where the second touch position is located or a region surrounding the second touch position as the specific region.

4. The method as recited in claim 1, wherein the first touch signal comprises a force parameter associated with a press force of the first touch, and the step of moving the at least one operable object in the target region to the specific region on the user interface at the specific speed further comprises:
   adjusting at least one of the target region, the number of the at least one to-be-moved operable object in the target region, the specific speed, and the specific region according to the force parameter.

5. An electronic device comprising:
   a touch screen configured to display a user interface, the user interface comprising at least one operable object;
   a sensor located on one side of the touch screen; and
   a processor coupled to the touch screen and the sensor, wherein the sensor is configured to detect a first touch, and the processor is configured to obtain a first touch signal corresponding to the first touch according to the first touch detected by the sensor;

if the first touch signal continuously exists, the touch screen is configured to detect a second touch, and the processor is further configured to obtain a second touch signal corresponding to the second touch according to the second touch detected by the touch screen, wherein the first touch signal corresponds to a first touch position, and the second touch signal corresponds to a second touch position;

the processor is further configured to obtain a base direction according to the first touch position and the second touch position and obtain a target region by extending by a distance toward the base direction from the second touch position on the user interface;

the processor is further configured to determine whether the at least one operable object is located within the target region and move the at least one operable object in the target region to a specific region on the user interface at a specific speed only if it is determined that the at least one operable object is located within the target region, wherein a distance between the at least one operable object and the second touch position before the at least one operable object is moved is greater than a distance between the at least one operable object and the second touch position after the at least one operable object is moved.

6. The electronic device as recited in claim 5, wherein a first distance is between the first touch position and the second touch position, a second distance is between the first touch position and the target region, and the second distance is greater than the first distance.

7. The electronic device as recited in claim 5, wherein the processor is further configured to set a region where the second touch position is located or a region surrounding the second touch position as the specific region.

8. The electronic device as recited in claim 5, wherein the first touch signal comprises a force parameter associated with a press force of the first touch, and the processor is further configured to adjust at least one of the target region, the number of the at least one to-be-moved operable object in the target region, the specific speed, and the specific region according to the force parameter.

* * * * *